(12) United States Patent
Yang

(10) Patent No.: US 8,956,424 B2
(45) Date of Patent: Feb. 17, 2015

(54) METHOD AND APPARATUS FOR SEQUENCING-BATCH PURIFICATION OF POTASSIUM NITRATE FROM SOLID WASTE PRODUCED BY GLASS-STRENGTHENING PROCESS

(71) Applicant: National Formosa University, Huwei Township, Yunlin County (TW)

(72) Inventor: Min-Hui Yang, Huwei Township, Yunlin County (TW)

(73) Assignee: National Formosa University, Huwei Township, Yunlin County (TW)

( * ) Notice: Subject to any disclaimer, the term of this patent is extended or adjusted under 35 U.S.C. 154(b) by 122 days.

(21) Appl. No.: 13/743,837

(22) Filed: Jan. 17, 2013

(65) Prior Publication Data

US 2013/0323156 A1 Dec. 5, 2013

(30) Foreign Application Priority Data

Jun. 4, 2012 (TW) .............................. 101210733 U
Jun. 22, 2012 (TW) .............................. 101122509 A

(51) Int. Cl.
*C01D 9/16* (2006.01)

(52) U.S. Cl.
CPC ........................................ *C01D 9/16* (2013.01)
USPC ...................... 23/302 R; 23/295 R; 23/308 R

(58) Field of Classification Search
USPC ...................... 23/308 R, 295 R, 302 R, 302 T
See application file for complete search history.

(56) References Cited

U.S. PATENT DOCUMENTS 8,834,806 B2 * 9/2014 Mizrahi ........................ 422/254

* cited by examiner

*Primary Examiner* — Edward Johnson
(74) *Attorney, Agent, or Firm* — Muncy, Geissler, Olds & Lowe, P.C.

(57) ABSTRACT

Provided is a method and an apparatus for purifying potassium nitrate from the solid waste produced by a chemical glass-strengthening process. In the method, the solid waste is melted into a liquid waste at first. Potassium nitrate of various purity grades can be obtained by batch processing the liquid waste through stepwise cooling processes of cooling the liquid waste to a first temperature facilitating the potassium nitrate contained in the liquid waste to be crystallized at a first rate and then cooling the liquid waste to a second temperature close to the freezing point of the potassium nitrate at a second rate that is slower than the first rate. The recovered potassium nitrate from the solid waste can be recycled and reused.

20 Claims, 5 Drawing Sheets

METHOD AND APPARATUS FOR SEQUENCING-BATCH PURIFICATION OF POTASSIUM NITRATE FROM SOLID WASTE PRODUCED BY GLASS-STRENGTHENING PROCESS

BACKGROUND OF THE INVENTION

1. Field of the Invention

The present invention relates generally to a solid waste purification method and more particularly, to a method that can effectively separate and purify potassium nitrate from a solid waste, which contains potassium nitrate and sodium nitrate and is produced by a chemical glass-strengthening process. The present invention also relates to an apparatus for implementing the purification method.

2. Description of the Related Art

Generally, there are two types of glass-strengthening processes, including physical strengthening treatment and chemical strengthening treatment. In the chemical strengthening treatment, the ion exchange reaction will occur when a glass of sodium silicate is immersed in molten potassium nitrate to replace sodium ions contained in the glass with potassium ions contained in the molten potassium nitrate, that is, small sodium ions in the glass are substituted by larger potassium ions, such that the surface strength of the glass is improved.

After the ion exchange reaction is proceeded for a period of time, the potassium nitrate contained in the molten salt thereof will be gradually displaced into sodium nitrate. Although the molten potassium nitrate in industrial grade inherently contains a minor amount of sodium ion, when the concentration of sodium nitrate contained in the reacted molten potassium nitrate increases to a certain extent, for example, the concentration of sodium nitrate may increase several ten times due to the ion exchange reaction, the ion exchange reaction may not be continuously conducted, resulting in that the surface strength of the glass cannot be effectively improved to a desired grade.

Therefore, although the reacted molten salt still contains a certain amount of potassium nitrate, it cannot however be applied in chemical strengthening treatment again. In order to reduce the cost, a part of the reacted molten salt is diluted with pure molten potassium nitrate and then the diluted molten salt is used in chemical strengthening treatment; however, the remaining part of the reacted molten salt may be useless and discarded. This is wasteful and environmentally unfriendly. In addition, because a large amount of pure molten potassium nitrate is used to dilute the reacted molten salt, the manufacturing cost is undesirably increased.

SUMMARY OF THE INVENTION

The present invention has been accomplished in view of the above-noted circumstances. It is therefore one objective of the present invention to provide a purification method for recovering the potassium nitrate from a solid waste produced by a chemical glass-strengthening process. As a result, the recovered potassium nitrate can be recycled and reused.

To achieve the above-mentioned objective, a purification method provided by the present invention is used to recover potassium nitrate from a solid waste that is produced by a glass-strengthening process and contains potassium nitrate and sodium nitrate. The purification method comprises the steps of (a) heating the solid waste to a melting temperature to melt the solid waste into a liquid waste in a first purifying tank, (b) cooling the liquid waste from the melting temperature to a first temperature for facilitating the potassium nitrate contained in the liquid waste to be crystallized as potassium nitrate crystal attached to a sidewall of the first purifying tank at a first rate, (c) cooling the liquid waste from the first temperature to a second temperature that is substantially close to the freezing point of the potassium nitrate at a second rate that is slower than the first rate, and (d) collecting the potassium nitrate crystal. By this method, the potassium nitrate can be effectively separated from the solid waste produced by chemical glass-strengthening process for recycle and reuse.

Another aspect of the present invention is to provide a purification method for recovering and purifying the potassium nitrate from a solid waste produced by a chemical glass-strengthening process so as to obtain potassium nitrate of various purity grades. To achieve the above-mentioned objective, the above-mentioned purification method may further comprises, after the step (c) and before the step (d), the steps of (e) introducing the liquid waste in the first purifying tank into a second purifying tank, and (f) conducting one of the following substeps of:

(f1) heating the liquid waste contained in the second purifying tank to the melting temperature, cooling the liquid waste from the melting temperature to the first temperature for facilitating the potassium nitrate contained in the liquid waste to be crystallized as potassium nitrate crystal attached to a sidewall of the second purifying tank at the first rate, and cooling the liquid waste from the first temperature to the second temperature at the second rate;

(f2) heating the potassium nitrate crystal attached to the sidewall of the first purifying tank to the melting temperature to melt potassium nitrate crystal into a molten liquid, cooling the molten liquid from the melting temperature to the first temperature for facilitating the potassium nitrate contained in the molten liquid to be crystallized as potassium nitrate crystal attached to the sidewall of the first purifying tank at the first rate, and cooling the molten liquid from the first temperature to the second temperature at the second rate; and (f3) heating the potassium nitrate crystal attached to the sidewall of the first purifying tank to the melting temperature to melt the potassium nitrate crystal into a molten liquid, introducing the molten liquid into a third purifying tank, cooling the molten liquid from the melting temperature to the first temperature for facilitating the potassium nitrate contained in the molten liquid to be crystallized as potassium nitrate crystal attached to a sidewall of the third purifying tank at the first rate, and cooling the molten liquid from the first temperature to the second temperature at the second rate.

Since the aforesaid step (f1) can further recover potassium nitrate from the residual liquid waste, most of the potassium nitrate contained in the solid waste can be separated therefrom. In addition, the aforesaid steps (f2) and (f3) can further purify the potassium nitrate crystal obtained from first-stage purification, such that potassium nitrate of various purity grades can be gained through the purification method of the present invention.

Preferably, after the step (c) and before the step (d), a step of cooling the liquid waste from the second temperature to a third temperature, which is substantially higher than the freezing point of the sodium nitrate, at a third rate slower than the second rate is carried out.

Preferably, the step (f1) further comprises a substep of cooling the liquid waste from the second temperature to a third temperature, which is substantially higher than the freezing point of the sodium nitrate, at a third rate slower than the second rate.

Preferably, each of the steps (f2) and (f3) further comprises a substep of cooling the molten liquid from the second temperature to a third temperature, which is substantially higher than the freezing point of the sodium nitrate, at a third rate slower than the second rate.

Preferably, the melting temperature ranges from 350° C. to 400° C. Preferably, the first temperature ranges from 340° C. to 350° C. Preferably, the second temperature ranges from 333° C. to 340° C. Preferably, the third temperature ranges from 315° C. to 333° C. Preferably, the first rate substantially ranges from 3° C./hr to 60° C./hr. Preferably, the second rate substantially ranges from 1.4° C./hr to 8.5° C./hr. Preferably, the third rate substantially ranges from 0.8° C./hr to 8.3° C./hr.

In the purification method of the present invention, the potassium nitrate crystal is attached to the sidewall of the first, second or third purifying tank due to the temperature difference produced between the sidewall and the bottom portion of the first, second or third purifying tank.

Still another objective of the present invention is to provide a purification apparatus for implementing the purification method disclosed above, so as to recover most of the potassium nitrate contained in a solid waste produced by a glass-strengthening process and obtain the potassium nitrate of various purity grades.

To achieve the above-mentioned objective, a purification apparatus provided by the present invention comprises a first purifying device, a second purifying device, and a connecting device connecting the first and second purifying devices. The first purifying device includes a first purifying tank having a bottom portion, a sidewall connected to the bottom portion, and a chamber defined by the sidewall and the bottom portion, a heater disposed at the bottom portion of the first purifying tank, a thermostat surrounding the sidewall of the first purifying tank, a temperature sensor disposed inside of the chamber, and a temperature controller electrically connected with the heater, the thermostat and the temperature sensor for controlling operations of the heater and the thermostat subject to the temperature sensor. The second purifying device includes a second purifying tank having a bottom portion, a sidewall connected to the bottom portion, and a chamber defined by the sidewall and the bottom portion, a heater disposed at the bottom portion of the second purifying tank, a thermostat surrounding the sidewall of the second purifying tank, a temperature sensor disposed inside of the chamber of the second purifying tank, and a temperature controller electrically connected with the heater, the thermostat, and the temperature sensor of the second purifying device for controlling operations of the heater and the thermostat of the second purifying device subject to the temperature sensor of the second purifying device. The connecting device includes a valve, a connecting tube, and a heating unit. The connecting tube includes a first channel connecting the first purifying tank and the valve, and a second channel connecting the valve and the second purifying tank. The heating unit includes a temperature sensor disposed at an outer surface of the connecting tube, a heating jacket covering the connecting tube and the temperature sensor, an insulation material covering the heating jacket, and a temperature controller electrically connected with the heating jacket and the temperature sensor for controlling an operation of the heating jacket subject to the temperature sensor of the heating unit.

Since the potassium nitrate contained in the solid waste can be recovered through the first purifying device, and the potassium nitrate remained in the residual liquid waste after first-stage purification can be further recovered through the second purifying device, most of the potassium nitrate contained in the solid waste can be separated therefrom.

In the purification apparatus of the present invention, it may further comprise a third purifying device so as to obtain potassium nitrate of various purity grades.

The third purifying device includes a third purifying tank having a bottom portion, a sidewall connected to the bottom portion, and a chamber defined by the sidewall and the bottom portion, a heater disposed at the bottom portion of the third purifying tank, a thermostat surrounding the sidewall of the third purifying tank, a temperature sensor disposed inside of the chamber of the third purifying tank, and a temperature controller electrically connected with the heater, the thermostat and the temperature sensor of the third purifying device for controlling operations of the heater and the thermostat of the third purifying device subject to the temperature sensor of the third purifying device.

More preferably, the connecting tube of the connecting device further includes a third channel connecting the valve and the third purifying tank, such that the molten liquid contained in the first purifying tank can flow from the first channel to the third channel while the valve is open.

Since the potassium nitrate crystal attached to the sidewall of the first purifying tank can be further purified through the third purifying device, the potassium nitrate having higher purity can be obtained by means of the apparatus provided by the present invention.

In a preferred embodiment of the purification apparatus of the present invention, the bottom portion of the first purifying tank may have an arc-shaped concave inner surface and a through hole located at a center of the inner surface and communicated with the first channel of the connecting tube. Besides, the first purifying device may further include a valve disposed within the through hole in such a way that the residual liquid waste or the molten liquid can completely flow into the first channel, thus preventing the residual liquid waste or the molten liquid to accumulate at the bottom portion of the first purifying tank.

In the purification apparatus of the present invention, at least one of the first, second and third purifying tanks may further have a top cover on which a thermostat is disposed. The top cover is capped on the sidewall of the respective purifying tank and is electrically connected with the temperature controller of the respective purifying device.

In the purification apparatus of the present invention, at least one of the first, second and third purifying devices may further include a hollow tubular barrel disposed within the chamber thereof. In this way, because potassium nitrate crystal may also attach to the wall of the barrel, it is easy to collect the potassium nitrate crystal by taking out the barrel from the chamber.

In the purification apparatus of the present invention, at least one of the first, second and third purifying devices may further include a liquid level gauge disposed within the chamber thereof, such that the approximate height of the potassium nitrate crystal attached to the sidewall can be obtained.

In the purification apparatus of the present invention, the heater can heat the liquid waste and/or the molten liquid up to 350° C. to 400° C. so as to completely melt the solid waste into the liquid waste and/or keep the molten liquid in the molten state.

In the purification apparatus of the present invention, the thermostat can maintain the temperature within the range of 150° C. to 340° C. so as to keep the temperature of the liquid waste and/or molten liquid within the range of 315° C. to 350°

C., such that potassium nitrate crystal can effectively crystallize out from the liquid waste and/or molten liquid and then attach to the sidewall.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

It is to be noted that the term 'close to' mentioned in the specification of the present invention may mean 'approximately higher than' or 'approximately lower than'.

Figure 1:
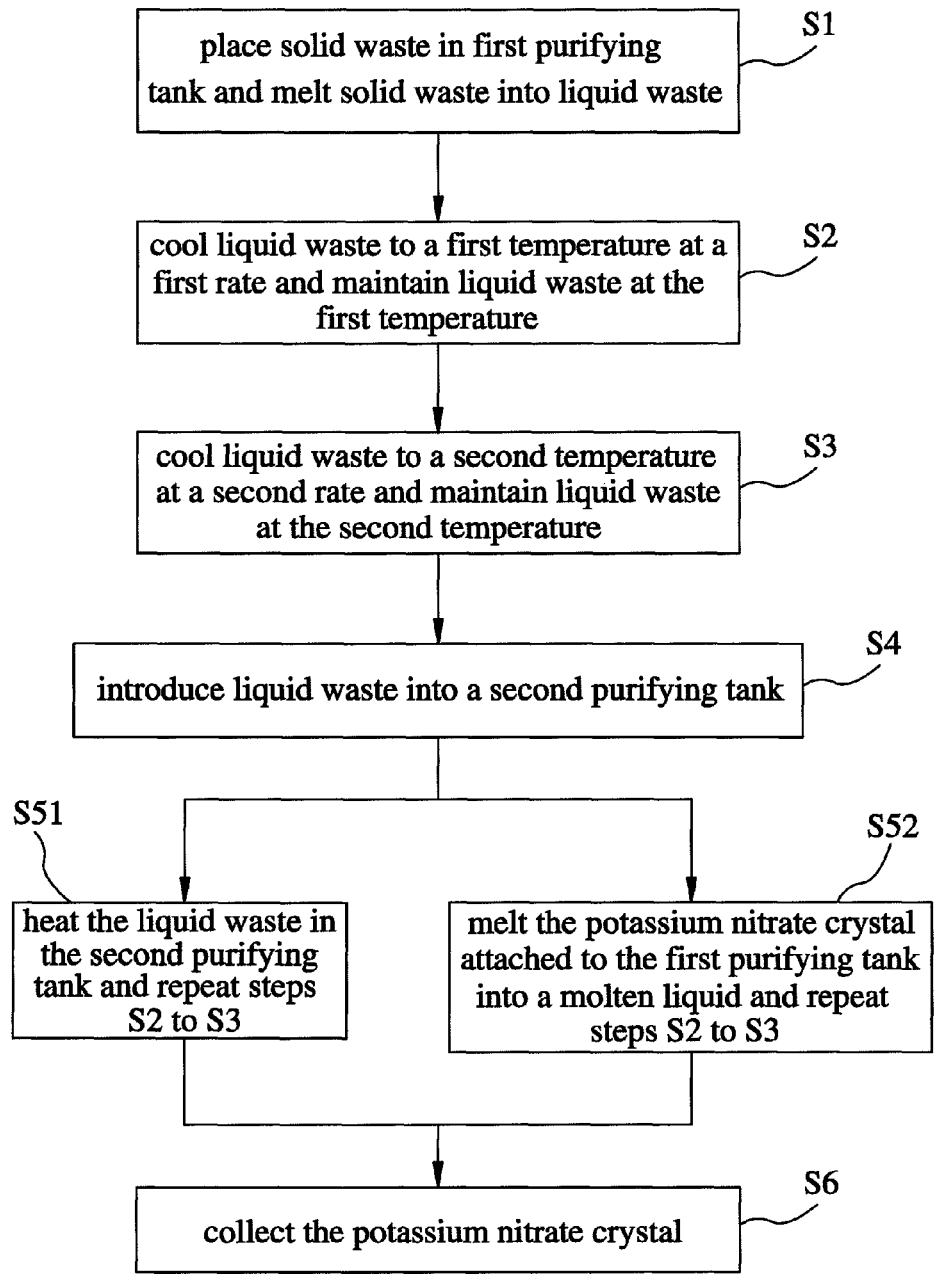
FIG. 1 is a flowchart of a purification method according to a preferred embodiment of the present invention.
Figure 2:
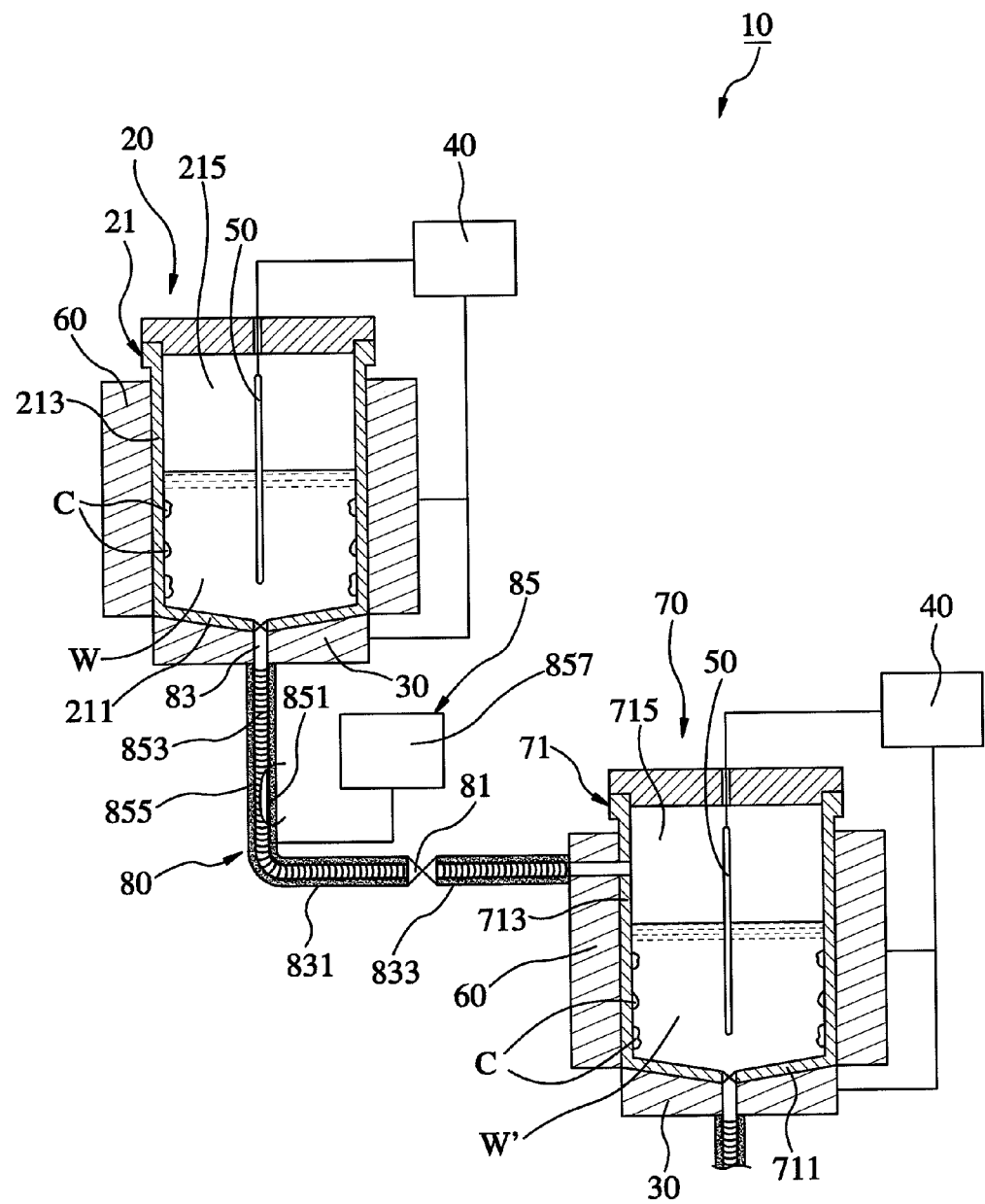
FIG. 2 is a schematic diagram of a purification apparatus for implementing the purification method of the preferred embodiment of the present invention.

As shown in FIGS. 1-2, in step S1 of a purification method provided according to a preferred embodiment of the present invention; a solid waste containing potassium nitrate ($KNO_3$) and sodium nitrate ($NaNO_3$) produced by a chemical glass-strengthening process is placed in a first purifying tank 21 of a first purifying device 20 of a purifying apparatus 10 provided by the present invention. After that, a heating device 30, such as an electric heater or an ceramic heater, is turned on for reaching at a melting temperature ranging from 350° C. to 400° C., and maintained in the aforesaid temperature for a period of from 1 to 10 hours or more than 10 hours, such that the solid waste is completely melted into a liquid waste W. In this case, a temperature controller 40 is set to a predetermined temperature, i.e. a temperature ranging from 350° C. to 400° C., such that the temperature controller 40 can control the heating device 30 and a thermostatic device 60 to maintain the liquid waste W within the predetermined temperature in accordance with the feedback signal of temperature sent by a temperature sensor 50.

Specifically speaking, in this preferred embodiment, the heating device 30 is disposed at the bottom portion 211 of the first purifying tank 21, and can be, but not limited to, a high-temperature hot plate capable of heating to 350° C. to 400° C. In this way, the solid waste contained in the first purifying tank 21 can be melted into the liquid waste W completely. In addition, the temperature controller 40 is electrically connected with the heating device 30, the temperature sensor 50 and the thermostatic device 60, such that increasing and lowering the temperatures of the heating device 30 and the thermostatic device 60 can be controlled by the temperature controller 40 in accordance with the actual temperature of the liquid waste W fed back from the temperature sensor 50. In this way, when the temperature of the liquid waste W contained in the first purifying tank 21 is found higher or lower than the predetermined temperature, the temperature controller 40 can immediately control the heating device 30 and the thermostatic device 60 to decrease or increase the temperatures thereof, thereby effectively control the temperature of the liquid waste W at the predetermined range. Further, the temperature sensor 50 is disposed in the chamber 215 of the first purifying tank 21 and in contact with the liquid waste W, and can be, but not limited to, a high-temperature thermometer, such that the temperature of the liquid waste W can be measured. The position of the temperature sensor 50 is not limited, but is preferably disposed in the center of the first purifying tank 21.

As to the thermostatic device 60, namely thermostat in the preferred embodiment, it surrounds the sidewall 213 of the first purifying tank 21, and can be, but not limited to, a flexible heating plate capable of keeping the temperature at a range of 150° C. to 340° C. In this way, the temperature of the liquid waste W can be kept within the range of 315° C. to 350° C., such that potassium nitrate crystal C can crystallize out from the liquid waste W.

In order to improve the efficiency of the thermostatic device 60, the aforesaid heating plate can be further covered with an insulation material (not shown). Besides, two vent valves (not shown) may be disposed between the insulation material and the heating plate and adjacent to the top and bottom end thereof, such that when the temperature of the liquid waste W is higher or lower than the predetermined temperature, the vent valve can be opened to decrease the temperature by air cycling or can be closed to increase the temperature. The manner for improving the efficiency of the thermostatic device 60 is only exemplary and the present invention is not limited thereto, for example, a cooling water channel may be disposed between the insulation material and the heating plate to achieve the aforesaid purpose.

Furthermore, the thermostatic device 60 may also be a two-piece thermostatic device comprising a first thermostatic member surrounding the sidewall 213 adjacent to the heating device 30, and a second thermostatic member surrounding the sidewall 213 adjacent to the first thermostatic member, such that the sidewall 213 of the first purifying tank 21 can have different temperature to increase the crystallization efficiency of potassium nitrate crystal C.

In the preferred embodiment, in addition to potassium nitrate ($KNO_3$) and sodium nitrate ($NaNO_3$), because some salt compounds such as phosphate, sulfate, or nitrite may be contained in the liquid waste W, the first purifying tank 21 is preferably made of stainless steel so as to avoid undesirable reaction between the first purifying tank 21 and the potassium and sodium ions, thereby preventing the damage to the first purifying tank 21 at high temperature caused by corrosion from the aforesaid salt compounds.

As shown in FIGS. 1-2, after step S1, the temperature of the heating device 30 is kept at the aforesaid melting temperature, for example at about 400° C., and the temperature of the thermostatic device 60 is kept within 150° C. to 340° C., such that the temperature of the liquid waste W can be maintained within about 315° C. to 350° C. Steps S2 and S3 are then proceeded to gradually decrease the temperature of the liquid waste W, that is, the temperature is decreased at a slower and slower rate, resulting in that potassium nitrate may crystallize out from the liquid waste W as much as possible. For example, a first temperature of about 350° C., i.e. a temperature slightly higher than the freezing point of potassium nitrate (about 333° C.) is set in step S2. After that, cooling the liquid waste W to the first temperature at a first rate, for example 50° C./hr in this case, and maintaining the temperature of the liquid waste W at the first temperature for a predetermined period of time, for example 1 hour in this case. As such, because the temperature of the liquid waste W close to the sidewall 213 is slightly lower than that of the liquid waste W close to the bottom portion 211, i.e. a temperature difference is produced between the sidewall 213 and the bottom portion 211, potassium nitrate crystal C gradually crystallizes out from the liquid waste W and attaches to the inner surface of the sidewall 213. It'll be appreciated that the predetermined time for maintaining the temperature of the liquid waste W at the first temperature is not limited to 1 hour. It can be 1 to 2 hours according to actual need.

In step S3, a second temperature of about 340° C., i.e. a temperature close to the freezing point of potassium nitrate (about 333° C.), is set. After that, slowly cooling the liquid waste W to the second temperature at a second rate slower than the first rate, for example 5° C./hr in this case, and maintaining the temperature of the liquid waste W at the second temperature for a longer predetermined period of time, for example, but not limited to 2 hour in this case. As such, because the second temperature is close to the freezing point of potassium nitrate, a longer predetermined time for maintaining the temperature of the liquid waste W at the second temperature enables more and more potassium nitrate crystal C to attach to the inner surface of the sidewall 213. The aforesaid predetermined time for maintaining the temperature of the liquid waste W at the second temperature can be 2 to 5 hours according to actual need.

As shown in FIGS. 1-2, in step S4 of the preferred embodiment, the residual liquid waste W' remained in the first purifying tank 21 after first-stage purification is introduced into a second purifying tank 71 of a second purifying device 70 through a connecting device 80.

The structure of the second purifying tank 71 is similar to that of the first purifying tank 21, and the second purifying tank 71 is also equipped with the heating device 30, the temperature controller 40, the temperature sensor 50, and the thermostatic device 60.

The connecting device 80 includes a valve 81, a connecting tube 83 and a heating unit 85. The valve 81 can be, but not limited to, a switch valve or a check valve. Preferably, the valve 81 is embodied in this embodiment as a metal seal valve made of stainless steel or copper so as to withstand high temperature. The connecting tube 83 has a first channel 831 connecting the first purifying tank 21 and the valve 81, and a second channel 833 connecting the valve 81 and the second purifying tank 71. As such, the residual liquid waste W' in the first purifying tank 21 can flow from the first channel 831 to the second channel 833 while the valve 81 is open. The heating unit 85 is used to control the temperature of the liquid waste W' inside the connecting tube 83 so as to keep the liquid waste W' in the molten state. The heating unit 85 in this preferred embodiment has a temperature sensor 851 disposed at the out surface of the connecting tube 83 for detecting the temperature of the connecting tube 83, a heating jacket 853 used to cover the connecting tube 83 and the temperature sensor 851 for heating and maintaining the liquid waste W' inside the connecting tube 83 in the molten state, an insulation material 855 used to cover the heating jacket 853 for keeping the temperature of the liquid waste W' inside the connecting tube 83, and a temperature controller 857 electrically connected to the temperature sensor 851 for controlling the temperature of the liquid waste W' inside the connecting tube 83.

Figure 3:
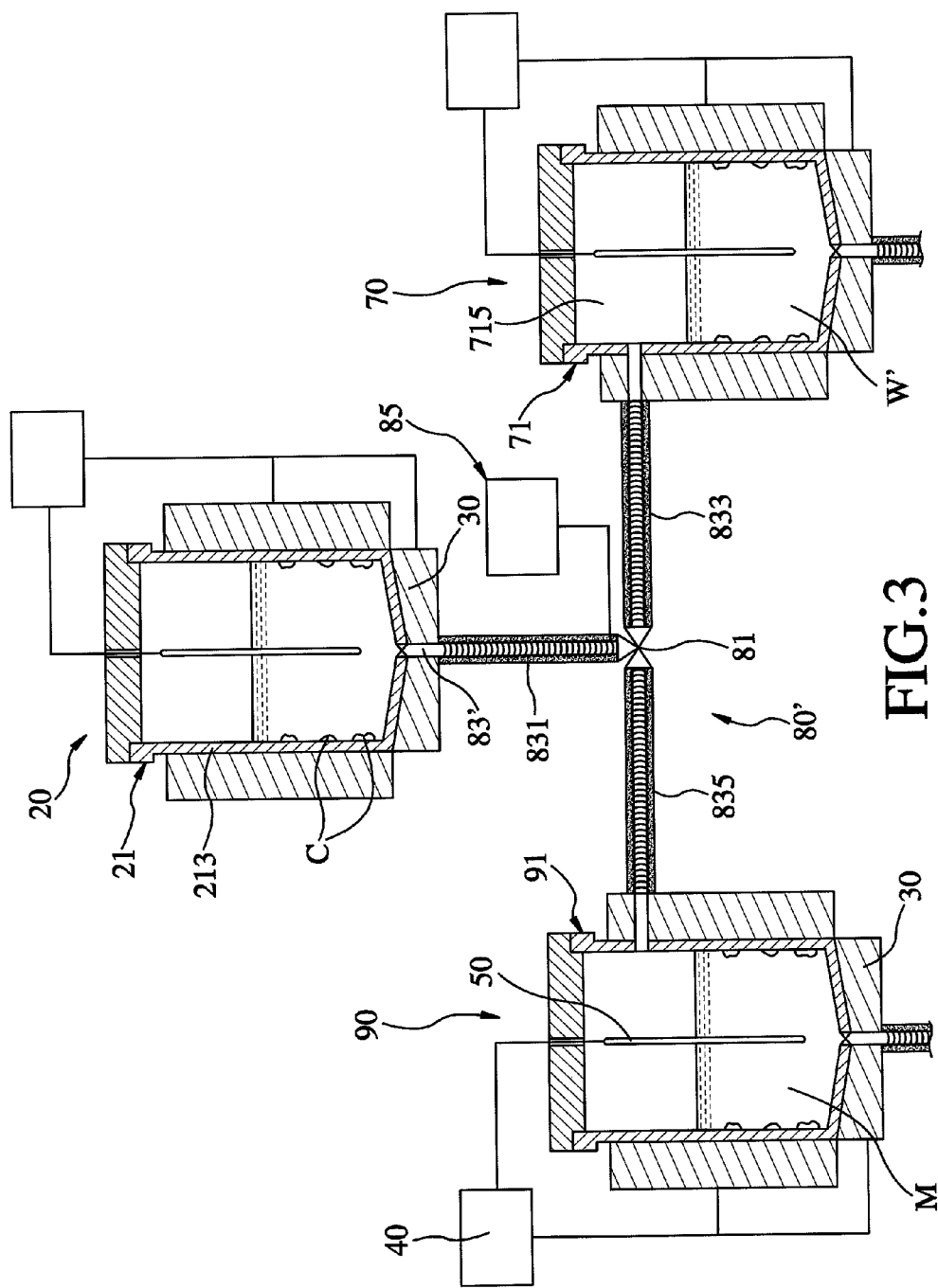
FIG. 3 is a schematic diagram of an alternate purification apparatus for implementing the purification method of the preferred embodiment of the present invention.

After step S4 shown in FIG. 1, that is, after the residual liquid waste W' in the first purifying tank 21 is completely introduced into the second purifying tank 71 through the connecting tube 83, steps S51 and S52 are performed separately and/or selectively. In step S51, the liquid waste W' in the second purifying tank 71 is reheated to the aforesaid melting temperature of about 350° C. to 400° C. and then the steps S2 and S3 are repeated, such that the potassium nitrate remained in the liquid waste W' can be further recovered. Accordingly, most of the potassium nitrate contained in the solid waste can be separated therefrom. In step S52, the potassium nitrate crystal C attached to the sidewall 213 of the first purifying tank 21 is reheated to the aforesaid melting temperature of about 350° C. to 400° C. to become molten liquid again, and then the steps S2 and S3 are repeated, such that the molten liquid can be further purified. Thus, potassium nitrate of various purity grades can be obtained through the purification method of the present invention. Specifically, apart from the first purifying tank 21, step S52 can be performed in a third purifying tank 91 of a third purifying device 90 as shown in FIG. 3. When the potassium nitrate crystal C is reheated to become the molten liquid M, it is introduced into the third purifying tank 91 through a connecting device 80', and then the steps S2 and S3 are repeated in the third purifying tank 91. The structure of the third purifying tank 91 is similar to that of the first purifying tank 21, and the third purifying tank 91 is also equipped with the heating device 30, the temperature controller 40, the temperature sensor 50, and the thermostatic device 60. The connecting device 80' includes the valve 81, a connecting tube 83' and the heating unit 85. The connecting tube 83' has the first channel 831, the second channel 833 and a third channel 835 connected between the valve 81 and the third purifying tank 91. As such, the molten liquid M in the first purifying tank 21 can flow from the first channel 831 to the third channel 835 while the valve 81 is selectively open to the third channel 835. That is, the first channel 831 and the second channel 833 or the first channel 831 and the third channel 835 are connected to each other by means of the three-way valve 81.

Finally, in step S6, the residual liquid waste W' after the purification in steps S51 and S52 is taken out from the associated tank respectively and the potassium nitrate crystal C thus obtained in the associated tank is collected respectively. In this embodiment, the residual liquid waste W' and the molten potassium nitrate can be directly extracted by a negative-pressure insulation extraction device disclosed in the inventor's Taiwan Patent No. M426447. However, the way for taking out the residual liquid waste W' or collecting the potassium nitrate crystal C is not limited thereto.

In order to recover most of the potassium nitrate from the residual liquid waste W' and obtain the potassium nitrate with higher purity grade, steps S51 and S52 can be repeated several times according to actual need.

In addition, since the second temperature is close to the freezing point of potassium nitrate (about 333° C.), the potassium nitrate of a certain amount may still remain in the liquid waste W' in step S4. Accordingly, the purification method of the present invention may further comprise, between steps S3 and S4, a step of slowly cooling the liquid waste W from the second temperature to a third temperature of about 315° C., which is higher than the freezing point of sodium nitrate (about 308° C.), at a third rate of about 2° C./hr, which is slower than the second rate, and then maintaining the temperature of the liquid waste W at the third temperature for a period of time, for example, but not limited to 5 hours in this case. In this way, the crystallization rate of the potassium nitrate crystal C may slow down gradually, such that the potassium nitrate contained in the liquid waste W may be further separated therefrom and sodium nitrate may not be crystallized therefrom. Preferably, the third temperature is substantially ranging from 315° C. to 333° C., and the time for maintaining the temperature of the liquid waste W at the third temperature can be 5 to 15 hours according to actual need.

Further, the steps S51 and/or S52 may also comprise a step of slowly cooling the liquid waste W' and/or the molten liquid M from the second temperature to the third temperature at the third rate slower than the second rate, and maintaining the temperature of the liquid waste W' and/or the molten liquid M at the third temperature for a period of time as mentioned above. As such, the potassium nitrate remained in the liquid waste W' and/or the molten liquid M may be further crystallized therefrom.

The amount of sodium ion existing in the residual liquid waste W' obtained from the purification method of the present invention is measured by ICP-OES (Inductively Coupled Plasma Optical Emission Spectrometry). The removal rate of the sodium ion is calculated from the following formula.

$$\text{Removal rate} = A/(A+B) \quad \text{[Formula]}$$

Wherein A represents the sodium ion concentration of residual liquid waste and B represents the sodium ion concentration in $KNO_3$ crystal.

It is shown that the sodium ion removal rate was about 80% by using the purification method of the present invention, which means that potassium nitrate can be effectively recovered from the liquid waste through the purification method provided by the present invention.

Figure 4:
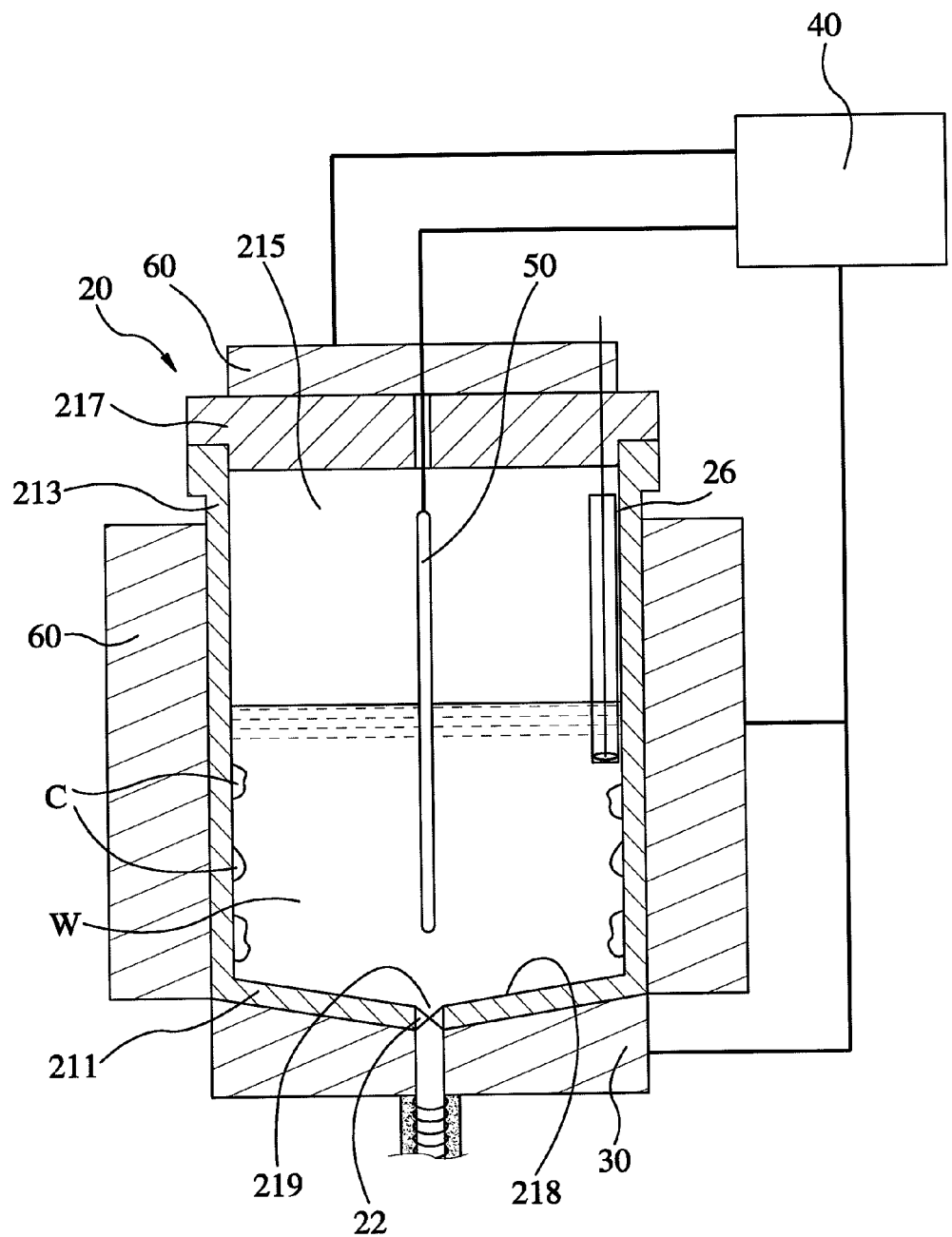
FIG. 4 is a schematic diagram showing the bottom portion of the first purifying tank having an arc-shaped concave inner surface.

Furthermore, according to the purification apparatus 10 provided by the present invention, in order to improve the homogeneity of the temperature of the liquid waste W in the chamber 215, the first purifying tank 21, as shown in FIG. 4, may be further capped with a top cover 217, which is mounted to the sidewall 213, and the first purifying device 20 may further comprise a thermostatic device 60 electrically connected with the temperature controller 40 and disposed on the top cover 217.

For the convenience of collecting the purified potassium nitrate crystal C and the residual liquid waste W' in the chamber 215, as shown in FIG. 4, the bottom portion 211 of the first purifying tank 21 may have an arc-shaped concave inner surface 218 and a through hole 219 located at the center of the inner surface 218. The first purifying device 20 may further include a valve 22 disposed within the through hole 219. As such, the residual liquid waste W' after first-stage purification can be completely discharged out of the chamber 215 so as to prevent the residual liquid waste W' to accumulate at the bottom portion 211 of the first purifying tank 21. Similarly, after the residual liquid waste W' is completely discharged out of the chamber 215, the potassium nitrate crystal C attached to the sidewall 213 can be melted and then discharged out of the chamber 215 through the through hole 219 so as to collect the purified potassium nitrate crystal C conveniently.

Figure 5:
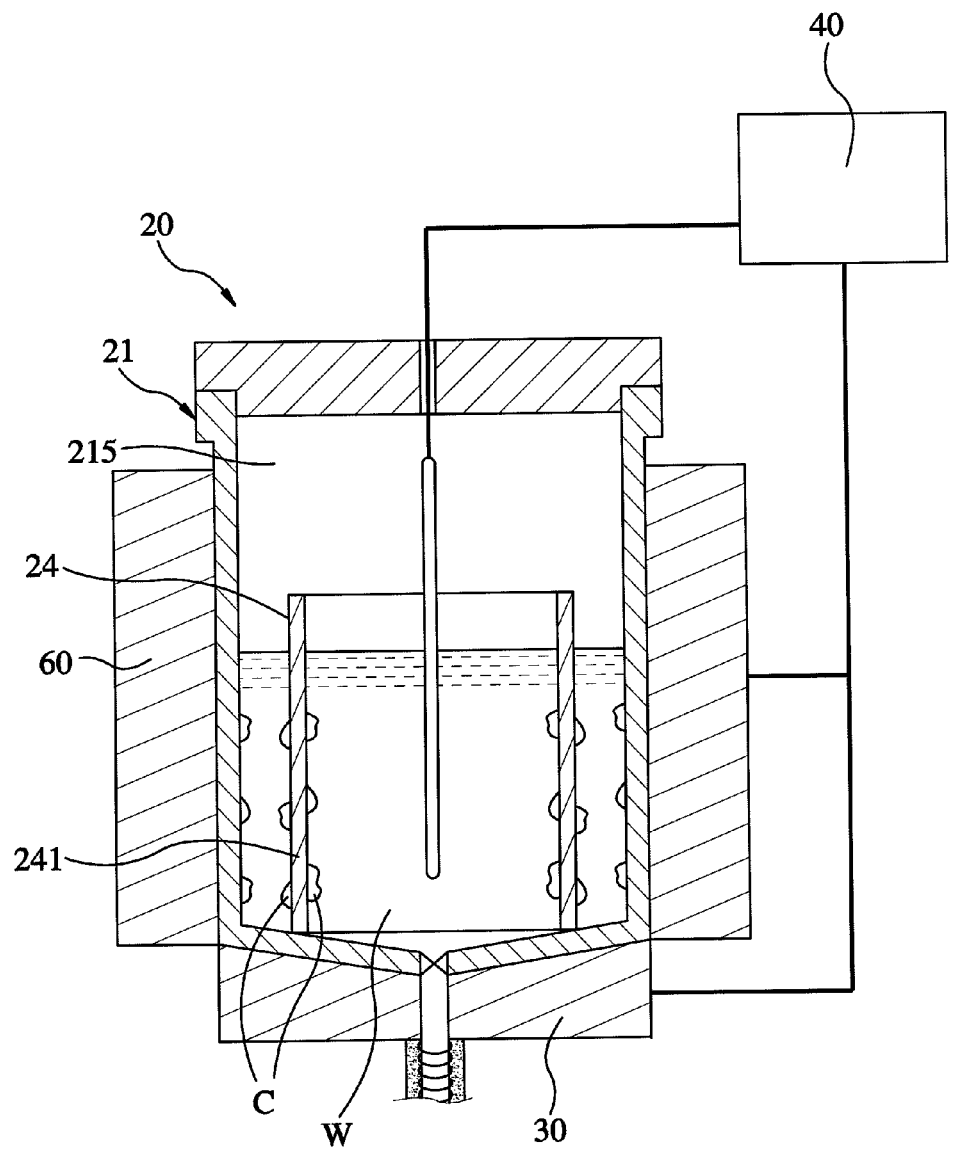
FIG. 5 is a schematic diagram showing the first purifying device including a hollow tubular barrel disposed within the chamber.

In addition, as shown in FIG. 5, for the convenience of collecting the purified potassium nitrate crystal C, the first purifying device 20 may further include a hollow tubular barrel 24 disposed within the chamber 215. As such, since the potassium nitrate crystal C can attach to the wall 241 of the barrel 24, it is easy to collect the potassium nitrate crystal C by taking out the barrel 24 from the chamber 215.

In order to estimate the approximate height of the potassium nitrate crystal C attached to the sidewall 213, as shown in FIG. 4, the first purifying device 20 may further include a liquid level gauge 26 disposed within the chamber 215, close to the sidewall 213 and in contact with the liquid waste W. For example, the liquid level gauge 26 used in the present invention may utilize the principle of conduction circuit to estimate the height of the potassium nitrate crystal C. Specifically speaking, in the beginning of the purification, since the liquid level gauge 26 is in contact with the liquid waste W containing sodium and potassium ions, the conductivity is higher. When the potassium nitrate crystal C crystallizes, the potassium nitrate crystal C may cover part of the detecting portion of the liquid level gauge 26, in the meantime, although some liquid waste W still penetrates to the potassium nitrate crystal C covering the liquid level gauge 26, the conductivity decreases slightly. When the potassium nitrate crystal C covering the liquid level gauge 26 increases to a level that the liquid waste W cannot penetrate thereto, the conductivity may drop to near zero. Thereby, the approximate height of the potassium nitrate crystal C can be estimated through the conductivity measured by the liquid level gauge 26.

Although the above-mentioned technical features are exemplified with and adopted by the first purifying tank 20, it will be appreciated that the second and third purifying tanks 70, 90 may also adopt the same technical features mentioned above.

In conclusion, because the purification method of the present invention comprises the steps of melting a solid waste into a liquid waste and cooling the liquid waste stepwise with various cooling rate, and can be applied to a sequencing-batch purification process, most of the potassium nitrate contained in the solid waste can be separated therefrom and potassium nitrate of various purity grades can be obtained, such that the recovered potassium nitrate from the solid waste can be recycled and reused in chemical glass-strengthening process. Thus, the purification method of the present invention is environmentally friendly and the manufacturing cost of the chemical glass-strengthening process can be decreased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A purification method for recovering potassium nitrate from a solid waste that is produced by a glass-strengthening process and contains potassium nitrate and sodium nitrate, the purification method comprising the steps of:
   (a) heating the solid waste to a melting temperature to melt the solid waste into a liquid waste in a first purifying tank;
   (b) cooling the liquid waste from the melting temperature to a first temperature for facilitating the potassium nitrate contained in the liquid waste to be crystallized as potassium nitrate crystal attached to a sidewall of the first purifying tank at a first rate;
   (c) cooling the liquid waste from the first temperature to a second temperature that is substantially close to the freezing point of the potassium nitrate at a second rate that is slower than the first rate; and
   (d) collecting the potassium nitrate crystal.

2. The purification method of claim 1, after the step (c) and before the step (d), further comprising a step of cooling the liquid waste from the second temperature to a third temperature, which is substantially higher than the freezing point of the sodium nitrate, at a third rate slower than the second rate.

3. The purification method of claim 2, wherein the melting temperature ranges from 350° C. to 400° C.; the first temperature ranges from 340° C. to 350° C.; the second temperature ranges from 333° C. to 340° C.; the third temperature ranges from 315° C. to 333° C.; the first rate substantially ranges from 3° C./hr to 60° C./hr; the second rate substantially ranges from 1.4° C./hr to 8.5° C./hr; the third rate substantially ranges from 0.8° C./hr to 8.3° C./hr.

4. The purification method of claim 1, wherein the melting temperature ranges from 350° C. to 400° C.; the first temperature ranges from 340° C. to 350° C.; the second temperature ranges from 333° C. to 340° C.

5. The purification method of claim 4, wherein the first rate substantially ranges from 3° C./hr to 60° C./hr; the second rate substantially ranges from 1.4° C./hr to 8.5° C./hr.

6. The purification method of claim 1, wherein a temperature difference exists between the sidewall of the first purifying tank and a bottom portion of the first purifying tank in step (b).

7. The purification method of claim 1, after the step (c) and before the step (d), further comprising the steps of:
(e) introducing the liquid waste in the first purifying tank into a second purifying tank; and
(f) conducting one of the following substeps of:
(f1) heating the liquid waste contained in the second purifying tank to the melting temperature, cooling the liquid waste from the melting temperature to the first temperature for facilitating the potassium nitrate contained in the liquid waste to be crystallized as potassium nitrate crystal attached to a sidewall of the second purifying tank at the first rate, and cooling the liquid waste from the first temperature to the second temperature at the second rate;
(f2) heating the potassium nitrate crystal attached to the sidewall of the first purifying tank to the melting temperature to melt potassium nitrate crystal into a molten liquid, cooling the molten liquid from the melting temperature to the first temperature for facilitating the potassium nitrate contained in the molten liquid to be crystallized as potassium nitrate crystal attached to the sidewall of the first purifying tank at the first rate, and cooling the molten liquid from the first temperature to the second temperature at the second rate; and
(f3) heating the potassium nitrate crystal attached to the sidewall of the first purifying tank to the melting temperature to melt the potassium nitrate crystal into a molten liquid, introducing the molten liquid into a third purifying tank, cooling the molten liquid from the melting temperature to the first temperature for facilitating the potassium nitrate contained in the molten liquid to be crystallized as potassium nitrate crystal attached to a sidewall of the third purifying tank at the first rate, and cooling the molten liquid from the first temperature to the second temperature at the second rate.

8. The purification method of claim 7, wherein the step (c) further comprises a substep of cooling the liquid waste from the second temperature to a third temperature, which is substantially higher than the freezing point of the sodium nitrate, at a third rate slower than the second rate.

9. The purification method of claim 8, wherein the step (f1) further comprises a substep of cooling the liquid waste from the second temperature to a third temperature, which is substantially higher than the freezing point of the sodium nitrate, at a third rate slower than the second rate.

10. The purification method of claim 9, wherein each of the steps (f2) and (f3) further comprises a substep of cooling the molten liquid from the second temperature to a third temperature, which is substantially higher than the freezing point of the sodium nitrate, at a third rate slower than the second rate.

11. The purification method of claim 10, wherein the melting temperature ranges from 350° C. to 400° C.; the first temperature ranges from 340° C. to 350° C.; the second temperature ranges from 333° C. to 340° C.; the third temperature ranges from 315° C. to 333° C.; the first rate substantially ranges from 3° C./hr to 60° C./hr; the second rate substantially ranges from 1.4° C./hr to 8.5° C./hr; the third rate substantially ranges from 0.8° C./hr to 8.3° C./hr.

12. The purification method of claim 7, wherein the melting temperature ranges from 350° C. to 400° C.; the first temperature ranges from 340° C. to 350° C.; the second temperature ranges from 333° C. to 340° C.

13. A purification apparatus for implementing the purification method of claim 7, comprising:
a first purifying device including:
a first purifying tank having a bottom portion, a sidewall connected to the bottom portion, and a chamber defined by the sidewall and the bottom portion;
a heater disposed at the bottom portion of the first purifying tank;
a thermostat surrounding the sidewall of the first purifying tank;
a temperature sensor disposed inside of the chamber; and
a temperature controller electrically connected with the heater, the thermostat and the temperature sensor for controlling operations of the heater and the thermostat subject to the temperature sensor;
a second purifying device including:
a second purifying tank having a bottom portion, a sidewall connected to the bottom portion, and a chamber defined by the sidewall and the bottom portion;
a heater disposed at the bottom portion of the second purifying tank;
a thermostat surrounding the sidewall of the second purifying tank;
a temperature sensor disposed inside of the chamber of the second purifying tank; and
a temperature controller electrically connected with the heater, the thermostat and the temperature sensor of the second purifying device for controlling operations of the heater and the thermostat of the second purifying device subject to the temperature sensor of the second purifying device; and
a connecting device connecting the first and second purifying devices, the connecting device including:
a valve;
a connecting tube having a first channel connecting the first purifying tank and the valve, and a second channel connecting the valve and the second purifying tank; and
a heating unit having a temperature sensor disposed at an outer surface of the connecting tube, a heating jacket covering the connecting tube and the temperature sensor, an insulation material covering the heating jacket, and a temperature controller electrically connected with the heating jacket and the temperature sensor for controlling an operation of the heating jacket subject to the temperature sensor of the heating unit.

14. The purification apparatus of claim 13, wherein the thermostat of the first purifying device and the thermostat of the second purifying device are set at a temperature ranging from 150° C. to 340° C.

15. The purification apparatus of claim 13, wherein the first purifying tank comprises a top cover on which a thermostat is disposed; the top cover is capped on the sidewall of the first purifying tank and is electrically connected with the temperature controller of the first purifying device.

16. The purification apparatus of claim 13, wherein the first purifying device comprises a hollow tubular barrel disposed within the chamber.

17. The purification apparatus of claim 13, wherein the thermostat of the first purifying device comprises a first thermostatic member adjacent to the heater, and a second thermostatic member adjacent to the first thermostatic member; the first thermostatic member has a higher temperature than the second thermostatic member.

18. The purification apparatus of claim 13, further comprising:
   a third purifying device including:
      a third purifying tank having a bottom portion, a sidewall connected to the bottom portion, and a chamber defined by the sidewall and the bottom portion;
      a heater disposed at the bottom portion of the third purifying tank;
      a thermostat surrounding the sidewall of the third purifying tank;
      a temperature sensor disposed inside of the chamber of the third purifying tank; and
      a temperature controller electrically connected with the heater, the thermostat and the temperature sensor of the third purifying device for controlling operations of the heater and the thermostat of the third purifying device subject to the temperature sensor of the third purifying device;
   wherein the connecting tube of the connecting device further includes a third channel connecting the valve and the third purifying tank.

19. The purification apparatus of claims 18, wherein the bottom portion of the first purifying tank has an arc-shaped concave inner surface and a through hole located at a center of the inner surface and communicated with the first channel of the connecting tube; wherein the first purifying device further includes a valve disposed within the through hole.

20. The purification apparatus of claims 13, wherein the bottom portion of the first purifying tank has an arc-shaped concave inner surface and a through hole located at a center of the inner surface and communicated with the first channel of the connecting tube; wherein the first purifying device further includes a valve disposed within the through hole.

* * * * *